(12) United States Patent
Jung

(10) Patent No.: US 10,569,476 B2
(45) Date of Patent: Feb. 25, 2020

(54) FIBRE COMPOSITE COMPONENT AND METHOD FOR THE PRODUCTION THEREOF, AND WING STRUCTURE

(71) Applicant: Airbus Operations GmbH, Hamburg (DE)

(72) Inventor: Manuel Jung, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 16/139,909

(22) Filed: Sep. 24, 2018

(65) Prior Publication Data
US 2019/0099960 A1 Apr. 4, 2019

(30) Foreign Application Priority Data
Sep. 28, 2017 (DE) .......................... 10 2017 217 339

(51) Int. Cl.
*B64C 3/18* (2006.01)
*B29C 65/54* (2006.01)
(Continued)

(52) U.S. Cl.
CPC ............ *B29C 65/54* (2013.01); *B29C 65/483* (2013.01); *B29C 66/1312* (2013.01); *B29C 66/721* (2013.01); *B29C 70/30* (2013.01); *B29C 70/446* (2013.01); *B29D 99/0003* (2013.01); *B29D 99/0007* (2013.01); *B64C 3/182* (2013.01); *B29C 65/4815* (2013.01); *B29C 65/5014* (2013.01); *B29C 65/546* (2013.01); *B29C 66/5241* (2013.01); *B29C 66/54* (2013.01); *B29C 66/7212* (2013.01); *B29C 66/73921* (2013.01); *B29C 66/73941* (2013.01); *B29C 70/36* (2013.01); *B29C 70/443* (2013.01);
(Continued)

(58) Field of Classification Search
CPC ............ Y10T 428/24182; B64C 3/182; B29C 66/1312; B29C 66/721
See application file for complete search history.

(56) References Cited

U.S. PATENT DOCUMENTS 8,651,850 B2  2/2014  Jacob et al.
9,096,021 B2  8/2015  Sander et al.

FOREIGN PATENT DOCUMENTS

DE  102008001498 B3  8/2009
DE  102008032834 B4  1/2010
WO  2010115853 A2  10/2010

OTHER PUBLICATIONS

German Search Report; priority document, dated Feb. 2018.

*Primary Examiner* — Alexander S Thomas
(74) *Attorney, Agent, or Firm* — Greer, Burns & Crain, Ltd.

(57) ABSTRACT

A fiber composite component having a first and a second fiber composite element each bent along a transverse axis opf the fiber composite component to have, respectively, in succession, a first and second base flange, a first and second web section, a first and second top flange and a first and second stiffening web. Respectively, the first and second base flanges are parallel to the first and second top flanges, the first and second web sections are angled with respect to each of the first and second base flanges and the first and second top flanges, the first and second stiffening webs are at right angles with respect to the first and second top flanges, and the first stiffening web and the second stiffening web are congruent with respect to one another, and are connected to one another, along a longitudinal axis of the fiber composite component.

15 Claims, 5 Drawing Sheets

(51) Int. Cl.
  B29C 65/48  (2006.01)
  B29C 65/00  (2006.01)
  B29C 70/30  (2006.01)
  B29C 70/44  (2006.01)
  B29D 99/00  (2010.01)
  B29L 31/30  (2006.01)
  B29L 31/00  (2006.01)
  B29C 70/36  (2006.01)
  B29C 65/50  (2006.01)
  B64C 1/12  (2006.01)

(52) U.S. Cl.
  CPC . *B29L 2031/003* (2013.01); *B29L 2031/3076* (2013.01); *B29L 2031/3085* (2013.01); *B32B 2605/18* (2013.01); *B64C 1/12* (2013.01); *Y10T 428/24182* (2015.01)

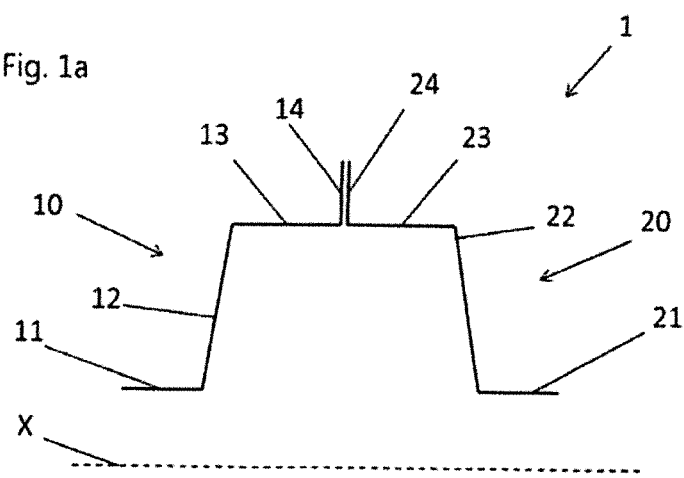
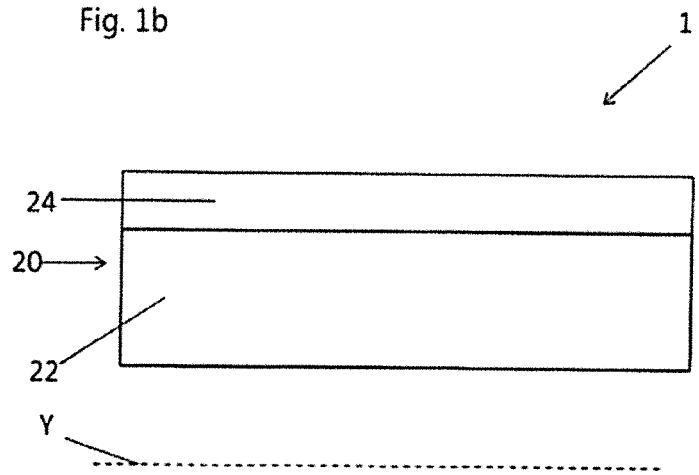

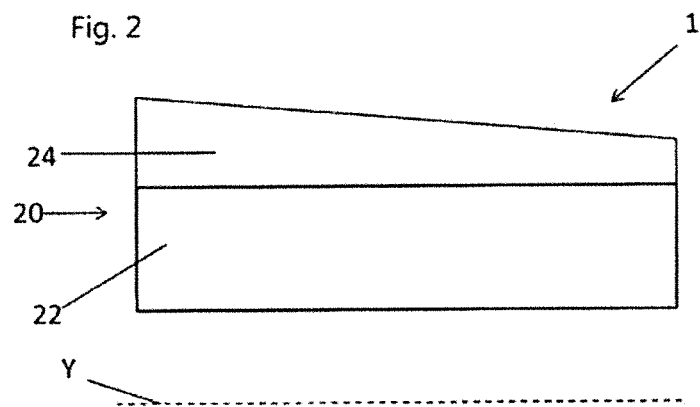
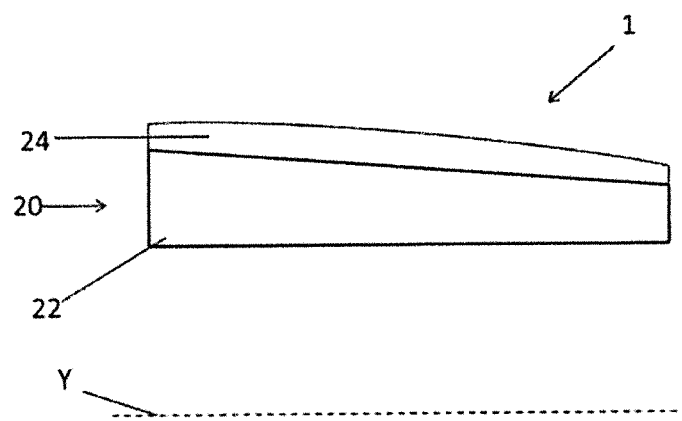

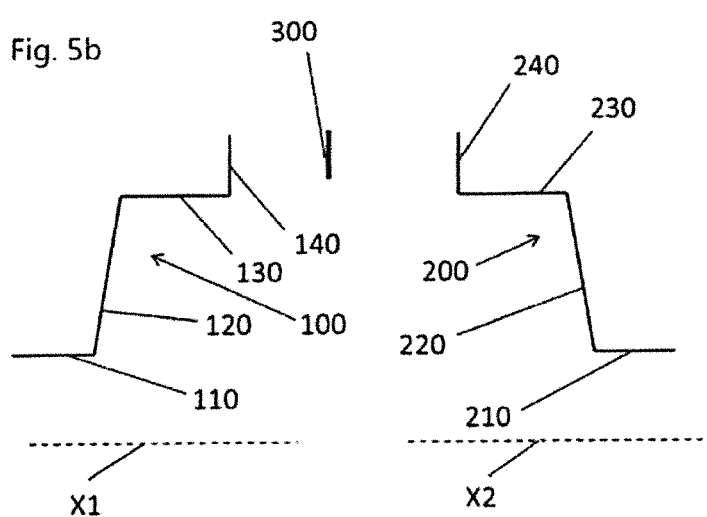
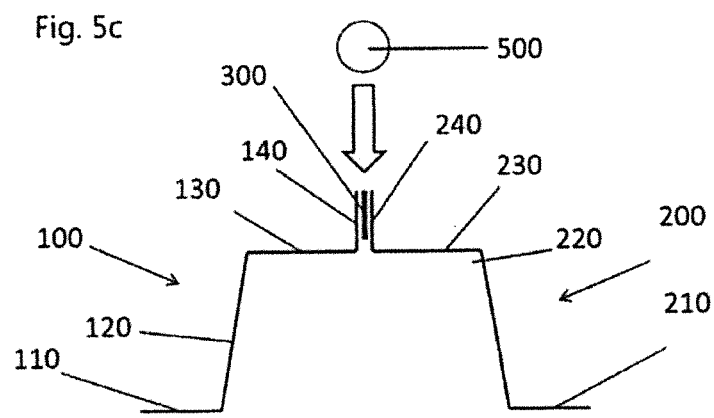

FIBRE COMPOSITE COMPONENT AND METHOD FOR THE PRODUCTION THEREOF, AND WING STRUCTURE

CROSS-REFERENCES TO RELATED APPLICATIONS

This application claims the benefit of the German patent application No. 10 2017 217 339.4 filed on Sep. 28, 2017, the entire disclosures of which are incorporated herein by way of reference.

BACKGROUND OF THE INVENTION

The present invention relates to a fiber composite component, in particular for use in aircraft and spacecraft construction, to a method for producing a fiber composite component of this type, and to a wing structure having a fiber composite component of this type.

In the aerospace sector, it is conventional to produce components for aircraft and spacecraft from fiber composite materials. Such fiber composite materials have similar material characteristics to components composed of solid material, while having only a fraction of the weight. To further improve the mechanical characteristics of shell-like components, such as, for example, fuselage and wing shells, additional stringers are used which are intended to increase the stiffness of the shells in a longitudinal direction.

For these stringers, use is preferably made of so-called omega stringers, because these generally have higher stiffness than the alternatively also known T stringers. An omega stringer of this type, and a method for the production thereof, is described for example in DE 10 2008 032 834 B4.

Omega stringers have a structure which is highly complex for fiber composite components, and accordingly complex to manufacture. In particular, if a stiffness which varies along the length of the stringer is desired, such as is the case, in particular, in the case of wing structures, the possibilities for realizing this had hitherto been limited. For this purpose, it is either necessary to perform complex shaping processes of the fiber composite materials, or additional fiber composite material must be provided.

SUMMARY OF THE INVENTION

Against this background, it is an object of the present invention to provide improved stringers for aircraft and spacecraft construction, which are easier to produce, even in the case of complex requirements, with regard to their stiffness characteristics.

Accordingly, a fiber composite component is provided. The fiber composite component comprises a first fiber composite element, which is bent along a transverse axis of the fiber composite component so as to have, in succession, a first base flange, a first web section, a first top flange and a first stiffening web, and comprises a second fiber composite element which is bent along the transverse axis so as to have, in succession, a second base flange, a second web section, a second top flange and a second stiffening web, wherein the first base flange and the first top flange are arranged parallel to one another, the first web section is arranged so as to be angled with respect to each of the first base flange and the first top flange, the first stiffening web is arranged at right angles with respect to the first top flange, the second base flange and the second top flange are arranged parallel to one another, the second web section is arranged at an angle with respect to each of the second base flange and the second top flange, the second stiffening web is arranged at right angles with respect to the second top flange, and the first stiffening web and the second stiffening web are arranged congruently with respect to one another, and are connected to one another, along a longitudinal axis of the fiber composite component.

Also provided is a method for producing a fiber composite component. The method comprises shaping a first fiber composite semifinished part such that it has, in succession along a first transverse axis, a first base flange, a first web section, a first top flange and a first stiffening web, wherein the first base flange and the first top flange are arranged parallel to one another, the first web section is arranged so as to be angled with respect to each of the first base flange and the first top flange, and the first stiffening web is arranged at right angles with respect to the first top flange, shaping a second fiber composite semifinished part such that it has, in succession along a second transverse axis, a second base flange, a second web section, a second top flange and a second stiffening web, wherein the second base flange and the second top flange are arranged parallel to one another, the second web section is arranged so as to be angled with respect to each of the second base flange and the second top flange, and the second stiffening web is arranged at right angles with respect to the second top flange, arranging and fixing the first fiber composite semifinished part and the second fiber composite semifinished part such that the first stiffening web and the second stiffening web are arranged congruently with respect to one another along a common longitudinal axis, introducing a matrix material into the first fiber composite semifinished part and into the second fiber composite semifinished part along the fiber orientations, and curing the matrix material.

Also provided is a wing structure for an aircraft. The wing structure comprises a stringer which comprises a fiber composite component according to the invention.

In the context of the present invention, the individual subsections of the fiber composite elements are arranged relative to one another exactly in the sequence in which they are listed in the text and are connected to their respective neighbor. That is to say, the first web section is situated between the first base flange and the first top flange and is connected to each of these. Additional optional sections may possibly also be situated between adjacent subsections, if a continuous connection between the listed subsections according to the invention can be defined in each case by means of the sections.

The concept on which the present invention is based comprises assembling a fiber composite component, which otherwise has substantially an omega profile, from two individual fiber composite elements. This makes it possible to form a ridge-like structure with which the stiffness of the fiber composite component can be set. Accordingly, the stiffness of the fiber composite component can be defined by the original shape of the individual fiber composite elements. In particular, the fiber composite elements can be correspondingly processed before being joined together, which permits simplified production of the fiber composite component.

Advantageous embodiments and refinements will emerge from the description with reference to the figures.

In one refinement, the first stiffening web and the second stiffening web may each have a width which varies along the longitudinal axis. This permits a modulation of the stiffness of the fiber composite component along the longitudinal axis in a particularly simple manner. Furthermore, the omega profile of the fiber composite component can remain constant along the longitudinal axis, which is particularly advantageous if, for the additional reinforcement, provision is made for the fiber composite component to be filled with a core.

In a further exemplary embodiment, the first fiber composite element and the second fiber composite element may be formed mirror-symmetrically with respect to one another about a central plane, which extends along the longitudinal axis, of the fiber composite component. This simplifies the production of the fiber composite component, because both fiber composite elements can be provided in an identical manner and using identical means.

In one refinement, the first fiber composite element and the second fiber composite element may be shaped such that the first web section and the second web section each have a width which varies along the longitudinal axis. This permits a space-saving and material-saving design of the fiber composite component, which may be particularly desirable for use in wing structures, because, in these, particular limitations are placed on volume and weight of a fiber composite component.

In a further exemplary embodiment, the angles between the first web section and the first base flange or the first top flange and between the second web section and the second base flange or the second top flange may each have a value between 95° and 115°. This permits an approximately right-angled design of the omega profile of the fiber composite component, which in turn corresponds to a particularly space-saving embodiment of the fiber composite component.

In one refinement, the fiber composite component may comprise a third fiber composite element in the region of the first stiffening web and of the second stiffening web. The third fiber composite element serves to further increase the stiffness of the fiber composite component. Accordingly, the first and the second fiber composite element can be manufactured in a standard form in advance, irrespective of the ultimately desired stiffness of the fiber composite component.

In a further exemplary embodiment, the third fiber composite element may be arranged between the first stiffening web and the second stiffening web and may be connected to each of these. This is a particularly easily implementable way of integrating the third fiber composite element into the fiber composite component.

In one refinement, the third fiber composite element may have a thickness which varies along the longitudinal axis. In this way, the third fiber composite element can contribute to modulating the stiffness of the fiber composite component. A substantially curvature-free fiber composite element of this type is furthermore easy to produce with a varying thickness.

It is self-evidently possible for all of the embodiments of the fiber composite component to also be transferred to the method for producing the same, and vice versa.

The above embodiments and refinements may be combined with one another in any desired manner expedient. Further possible embodiments, refinements and implementations of the invention also encompass combinations, which are not explicitly mentioned, of features of the invention described above or below with regard to the exemplary embodiments. In particular, here, a person skilled in the art will also add individual aspects as improvements or additions to the respective basic form of the present invention.

BRIEF DESCRIPTION OF THE DRAWINGS

The present invention will be discussed in more detail below on the basis of the exemplary embodiments specified in the schematic figures, in which:

FIG. 1a shows a schematic cross section through a fiber composite component as per an exemplary embodiment of the present invention;

FIG. 1b shows a schematic side view of the exemplary embodiment from FIG. 1a;

FIG. 2 shows a schematic side view of a further exemplary embodiment of a fiber composite component;

FIG. 3 shows a schematic side view of a further exemplary embodiment of the fiber composite component;

FIGS. 5a-c are schematic illustrations of some selected steps of a method for producing a fiber composite component;

Figure 4:
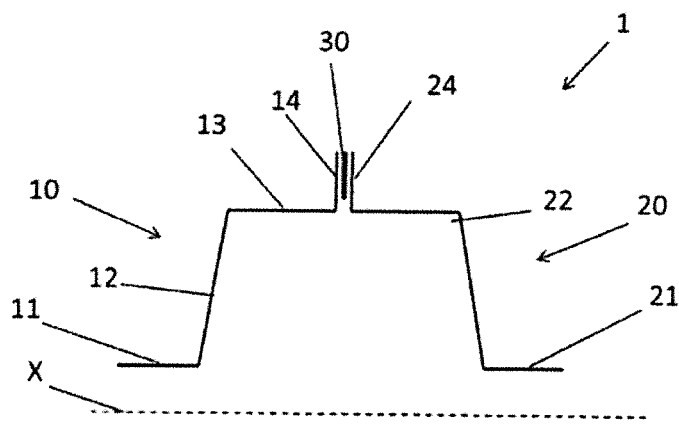
FIG. 4 shows a schematic cross section through a further exemplary embodiment of a fiber composite component.

The appended figures are intended to impart further understanding of the embodiments of the invention. They illustrate embodiments and serve, in conjunction with the description, for explaining principles and concepts of the invention. Other embodiments, and many of the stated advantages, will emerge with regard to the drawings. The elements of the drawings are not necessarily shown true to scale relative to one another.

DETAILED DESCRIPTION OF THE PREFERRED EMBODIMENTS

Elements, features and components which are identical, functionally identical and have the same action are denoted in each case by the same reference designations in the figures, unless stated otherwise.

In the exemplary embodiments shown here, the fiber composite components and fiber composite elements are, for a more straightforward illustration, shown with predominantly straight subsections. In reality, such fiber composite components however have curvatures, which are in part highly complex. In this respect, expressions which define the individual subsections of the fiber composite components and the geometrical relationships thereof with respect to one another in terms which are typical for straight lines and planes are to be correspondingly interpreted more broadly for the field of use of the present invention.

In particular, the expression "parallel" is to be understood to mean that two surfaces which are planar, and/or which are at least singly curved at least in sections notionally extend in space so as to be uniformly spaced apart from one another at least in regions. As a particularly simple example, the shell surfaces of two cylinders with cylinder axes extending parallel would be understood as "parallel" within the meaning of the application.

Where the angles between two subsections of a fiber composite component are described in the context of this application, these do not imperatively mean the exact angles at the connecting points or connecting axes of the sections. Since the transitions between individual subsections may, in reality, often be curved and flowing, such a strict interpretation would not be expedient. Rather, what is meant are the angles between regression planes which describe the individual subsections.

FIG. 1a shows a schematic cross section through a fiber composite component 1 according to an exemplary embodiment of the present invention. The notional transverse axis X, indicated by a dashed line, of the fiber composite component 1 extends, in this case, horizontally through the drawing. The fiber composite component 1 comprises a first fiber composite element 10 and a second fiber composite element 20, which in this exemplary embodiment are of mirror-symmetrical form. The first fiber composite element 10 has, in succession from left to right, a first base flange 11, a first web section 12, a first top flange 13 and a first stiffening web 14. The second fiber composite element 20 has, in succession from right to left, a second base flange 21, a second web section 22, a second top flange 23 and a second stiffening web 24.

The first base flange 11 is arranged horizontally. The right-hand end of the first base flange 11 is connected to the left-hand end of the first web section 12. The angle between the first web section 12 and the first base flange 11 is approximately 100°. The right-hand end of the first web section 12 is connected to the left-hand end of the first top flange 13. The first top flange 13 is arranged horizontally. The right-hand end of the first top flange 13 is connected to the lower end of the first stiffening web 14. The first stiffening web 14 is arranged vertically.

The second base flange 21 is arranged horizontally. The left-hand end of the second base flange 21 is connected to the right-hand end of the second web section 22. The angle between the second base flange 21 and the second web section 22 is approximately 100°. The left-hand end of the second web section 22 is connected to the right-hand end of the second top flange 23. The second top flange 23 is arranged horizontally. The left-hand end of the second top flange 23 is connected to the lower end of the second stiffening web 24. The second stiffening web 24 is arranged vertically.

For the sake of a clear illustration, the first stiffening web 14 and the second stiffening web 24 are illustrated as being spaced apart from one another. In a real fiber composite component 1, the first stiffening web 14 and the second stiffening web 24 would be connected congruently to one another.

As can be clearly seen, the first base flange 11, the first web section 12, the first top flange 13, the second top flange 23, the second web section 22 and the second base flange 21 form a typical omega profile. The first stiffening web 14 and the second stiffening web 24 together form a ridge-like structure, which additionally stiffens the fiber composite component 1.

FIG. 1b shows a schematic side view of the fiber composite component 1 from FIG. 1a. In this view, only the second fiber composite element 20 can be seen, in particular the second web section 22 and the second stiffening web 24. The notional longitudinal axis Y of the fiber composite component extends horizontally in this view. The second stiffening web 24 is arranged above the second web section 22. The second web section 22 and the second stiffening web 24 both have horizontally oriented rectangular lateral profiles.

In this case, the stiffness of the fiber composite component 1 is constant along the longitudinal axis Y. This exemplary embodiment of a fiber composite component 1 is particularly easy to produce owing to its simple geometries.

FIG. 2 shows a schematic side view of a further exemplary embodiment of a fiber composite component 1. The exemplary embodiment shown here differs from the exemplary embodiment shown in FIG. 1b in that the second stiffening web 24 has a width which decreases continuously along the longitudinal axis Y. The second stiffening web 24 thus has a trapezoidal lateral profile. The lower edge of the second stiffening web 24 is again arranged horizontally. The left-hand edge and the right-hand edge of the second stiffening web 24 are formed parallel to one another, wherein the right-hand edge is formed so as to be shorter than the left-hand edge.

In this exemplary embodiment, the stiffness of the fiber composite component 1 decreases continuously from left to right. Such a stiffness profile is advantageous, for example, in wing structures, wherein, in this case, the fuselage of the aircraft would be arranged at the left, and the wingtip would be arranged at the right.

FIG. 3 shows a schematic side view of a further exemplary embodiment of a fiber composite component 1. This exemplary embodiment differs from that shown in FIG. 1b in that the second web section 22 has a width which decreases continuously along the longitudinal axis Y. The second web section 22 thus has a trapezoidal lateral profile. The lower edge of the second web section 22 is again arranged horizontally. The left-hand edge and the right-hand edge of the second web section are formed parallel to one another, wherein the right-hand edge is formed so as to be shorter than the left-hand edge. The second stiffening web 24 has a width which varies along the longitudinal axis Y, whereby the upper edge of the second stiffening web 24 has a continuous curvature.

The fiber composite component 1 shown in FIG. 3 requires altogether less material than the exemplary embodiments shown in FIG. 1b and FIG. 2. Furthermore, the stiffness of the fiber composite component 1 is modulated such that the stiffness changes more slowly in the left-hand half of the fiber composite component 1 than in the right-hand half. Such a stiffness profile could be realized only with difficulty with the methods known from the prior art but can be implemented without great problems by means of the stiffness modulation by means of the first stiffening web 14 and the second stiffening web 24.

FIG. 4 shows a schematic cross section through a further exemplary embodiment of a fiber composite component 1. The fiber composite component 1 shown here differs from that shown in FIG. 1a by a third fiber composite element 30, which is arranged between the first stiffening web 14 and the second stiffening web 24.

In this case, too, for clearer illustrations, spacings are shown between the first stiffening web 14 and the third fiber composite element 30 and between the third fiber composite element 30 and the second stiffening web 24. In a real fiber composite component 1, these constituent parts would, however, be connected to one another without spacings.

The fiber composite component 1 shown in FIG. 4 has a greater stiffness than the fiber composite component 1 shown in FIG. 1a, because the third fiber composite element 30 additionally stiffens the fiber composite component 1. In this way, the first fiber composite element 10 and the second fiber composite element 20 can be used to form fiber composite components 1 with different stiffnesses, by virtue of the thickness of the third fiber composite element 30 being selected correspondingly. In this cross-sectional view, the profile of the thickness of the third fiber composite element 30 along the longitudinal axis Y is not visible. The third fiber composite element 30 may have a constant thickness or a varying thickness along the longitudinal axis Y.

Figure 5A:
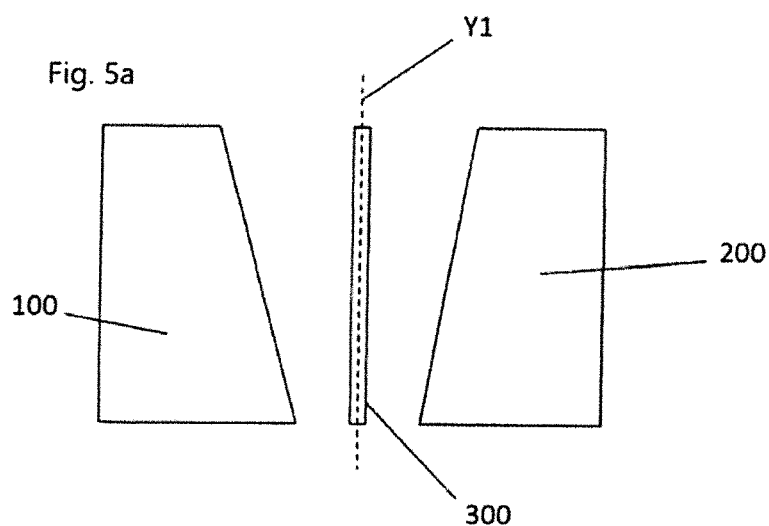

FIGS. 5a to 5c show selected steps of an exemplary method for producing a fiber composite component.

FIG. 5a shows a schematic plan view of an initial state before the exemplary method is carried out. It is possible to see a first fiber composite semifinished part 100 and a second fiber composite semifinished part 200. The first fiber composite semifinished part 100 and the second fiber composite semifinished part 200 each have a trapezoidal outline and are formed mirror-symmetrically with respect to one another about a common notional longitudinal axis Y1. The first fiber composite semifinished part 100 is, in this case, arranged on the left-hand side, wherein the left-hand edge of the first fiber composite semifinished part 100 is oriented vertically and the lower and upper edges are each oriented horizontally. The upper edge is, in this case, shorter than the lower edge, and the first fiber composite semifinished part 100 becomes narrower from bottom to top. The second fiber composite semifinished part 200 is of correspondingly symmetrical form. An optional third fiber composite semifinished part 300 is arranged centrally between the first fiber composite semifinished part 100 and the second fiber composite semifinished part 200 and has a rectangular outline.

FIG. 5b shows a schematic cross-sectional view after a process of deformation of the first fiber composite semifinished part 100 and of the second fiber composite semifinished part 200. The first fiber composite semifinished part 100 has, in succession from left to right along a first notional transverse axis X1, a first base flange 110, a first web section 120, a first top flange 130 and a first stiffening web 140. The second fiber composite semifinished part 200 has, from left to right along a second notional transverse axis X2, a second base flange 210, a second web section 220, a second top flange 230 and a second stiffening web 240.

The first base flange 110 is arranged horizontally. The right-hand end of the first base flange 110 is connected to the left-hand end of the first web section 120. The angle between the first web section 120 and the first base flange 110 is approximately 100°. The right-hand end of the first web section 120 is connected to the left-hand end of the first top flange 130. The first top flange 130 is arranged horizontally. The right-hand end of the first top flange 130 is connected to the lower end of the first stiffening web 140. The first stiffening web 140 is arranged vertically.

The second base flange 210 is arranged horizontally. The left-hand end of the second base flange 210 is connected to the right-hand end of the second web section 220. The angle between the second base flange 210 and the second web section 220 is approximately 100°. The left-hand end of the second web section 220 is connected to the right-hand end of the second top flange 230. The second top flange 230 is arranged horizontally. The left-hand end of the second top flange 230 is connected to the lower end of the second stiffening web 240. The second stiffening web 240 is arranged vertically.

The optional third fiber composite semifinished part 300 is oriented vertically and is arranged centrally between the first stiffening web 140 and the second stiffening web 240.

FIG. 5c shows a schematic cross-sectional view of the introduction of a matrix material 500. The first fiber composite semifinished part 100 and the second fiber composite semifinished part 200 from FIG. 5b are, in this case, arranged such that the first stiffening web 140 and the second stiffening web 240 are each connected to the optional third fiber composite semifinished part 300. For the sake of clarity, the individual constituent parts are, in this case, again illustrated with small spacings to one another.

The matrix material 500 is introduced into the fiber composite semifinished parts vertically downward along the arrow direction indicated. It is particularly advantageous here that the matrix material 500 can propagate along the orientation of the fibers of the fiber composite semifinished part purely under the force of gravity. The introduction of the matrix material 500 is thus promoted in relation to methods from the prior art, in which matrix material must be introduced transversely with respect to the orientation of the fibers.

Figure 6:
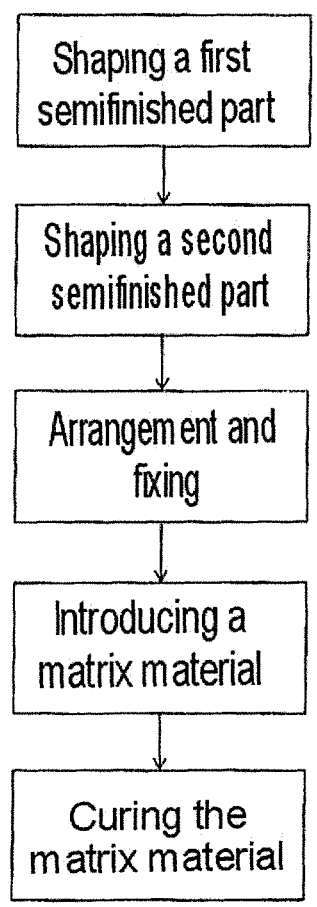
FIG. 6 shows a schematic flow diagram of an exemplary method for producing a fiber composite component.

FIG. 6 shows a schematic flow diagram of an exemplary method for the production of a fiber composite component.

Here, in one method step, a first fiber composite semifinished part 100 is shaped so as to have, in succession along a first transverse axis X1, a first base flange 110, a first web section 120, a first top flange 130 and a first stiffening web 140, wherein the first base flange 110 and the first top flange 130 are arranged parallel to one another, the first web section 120 is arranged so as to be angled with respect to each of the first base flange 110 and the first top flange 130, and the first stiffening web 140 is arranged at right angles with respect to the first top flange 130.

In a subsequent method step, a second fiber composite semifinished part 200 is deformed so as to have, in succession along a second transverse axis X2, a second base flange 210, a second web section 220, a second top flange 230 and a second stiffening web 240, wherein the second base flange 210 and the second top flange 230 are arranged parallel to one another, the second web section 220 is arranged so as to be angled with respect to each of the second base flange 210 and the second top flange 230, and the second stiffening web 240 is arranged at right angles with respect to the second top flange 230.

In a subsequent method step, the first fiber composite semifinished part 100 and the second fiber composite semifinished part 200 are arranged and fixed such that the first stiffening web 140 and the second stiffening web 240 are arranged congruently with respect to one another along a common longitudinal axis Y1. In this method step, an optional third fiber composite semifinished part 300 may simultaneously be arranged and fixed in the region of the first stiffening web 140 and of the second stiffening web.

This is followed by a method step in which a matrix material 500 is introduced into the first fiber composite semifinished part 100 and into the second fiber composite semifinished part 200 along the fiber orientations. If an optional third fiber composite semifinished part 300 is provided, the matrix material 500 is, in this step, also introduced into the optional third fiber composite semifinished part 300.

This is followed by a further method step, in which the matrix material 500 is cured.

To carry out a method of this type, all of the auxiliary means and devices known for the production of fiber composite semifinished parts may be used correspondingly. Here, it should be readily evident to a person skilled in the art to what extent existing auxiliary means and devices must possibly be modified such that they are suitable for carrying out the method described here.

A particular sequence of the individual method steps has been presented or at least indicated in FIGS. 5a-5c and FIG. 6. The present invention is, however, not intended to be restricted in any way to only this single sequence of method steps. It is clearly evident to a person skilled in the art what sequences of method steps are expedient for the production of a fiber composite component. In particular, the method steps of the deformation of the first fiber composite semifinished part 100 and of the second fiber composite semifinished part 200 may also be performed in the reverse sequence or else simultaneously. Also, the method steps of the introduction of the matrix material 500 and of the curing of the matrix material 500 may take place at any desired point in time during the method. For example, it would be conceivable for the matrix material 500 to be introduced prior to the deformation of the fiber composite semifinished parts and to be cured after the deformation, and for the cured fiber composite semifinished parts to subsequently be connected to one another.

The fiber composite components described here are not in any way restricted with regard to their material composition. The fibers used may, for example, be carbon fibers, aramid fibers, glass fibers, ceramic fibers or all other known fibers. All common thermosets, elastomers, thermoplastic materials or the like may be provided as matrix material.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE DESIGNATIONS

1 Fiber composite component
10 First fiber composite element
11 First base flange
12 First web section
13 First top flange
14 First stiffening web
20 Second fiber composite element
21 Second base flange
22 Second web section
23 Second top flange
24 Second stiffening web
25 Third fiber composite element
100 First fiber composite semifinished product
110 First base flange
120 First web section
130 First top flange
140 First stiffening web
200 Second fiber composite semifinished part
210 Second base flange
220 Second web section
230 Second top flange
240 Second stiffening web
300 Third fiber composite semifinished part
X Transverse axis
Y Longitudinal axis
X1 First transverse axis
X2 Second transverse axis
Y1 Common longitudinal axis

The invention claimed is:

1. A fiber composite component, comprising:
   a first fiber composite element which is bent along a transverse axis of the fiber composite component so as to have, in succession, a first base flange, a first web section, a first top flange and a first stiffening web; and
   a second fiber composite element which is bent along the transverse axis so as to have, in succession, a second base flange, a second web section, a second top flange and a second stiffening web;
   wherein the first base flange and the first top flange are arranged parallel to one another,
   the first web section is arranged so as to be angled with respect to each of the first base flange and the first top flange,
   the first stiffening web is arranged at right angles with respect to the first top flange,
   the second base flange and the second top flange are arranged parallel to one another,
   the second web section is arranged at an angle with respect to each of the second base flange and the second top flange,
   the second stiffening web is arranged at right angles with respect to the second top flange, and
   the first stiffening web and the second stiffening web are arranged congruently with respect to one another, and are connected to one another, along a longitudinal axis of the fiber composite component.

2. The fiber composite component according to claim 1, wherein the first stiffening web and the second stiffening web each have a width which varies along the longitudinal axis.

3. The fiber composite component according to claim 1, wherein the first fiber composite element and the second fiber composite element are formed mirror-symmetrically with respect to one another about a central plane, which extends along the longitudinal axis, of the fiber composite component.

4. The fiber composite component according to claim 1, wherein the first fiber composite element and the second fiber composite element are shaped such that the first web section and the second web section each have a width which varies along the longitudinal axis.

5. The fiber composite component according to claim 1, wherein the angles between the first web section and the first base flange or the first top flange, and between the second web section and the second base flange or the second top flange, each have a value between 95° and 115°.

6. The fiber composite component according to claim 1, wherein the fiber composite component comprises a third fiber composite element in a region of the first stiffening web and of the second stiffening web.

7. The fiber composite component according to claim 6, wherein the third fiber composite element is arranged between the first stiffening web and the second stiffening web and is connected to each of these.

8. The fiber composite component according to claim 6, wherein the third fiber composite element has a thickness which varies along the longitudinal axis.

9. A wing structure for an aircraft or spacecraft, having a stringer which has a fiber composite component according to claim 1.

10. A method for producing a fiber composite component, wherein the method comprises the following steps:
   shaping a first fiber composite semifinished part such that it has, in succession along a first transverse axis, a first base flange, a first web section, a first top flange and a first stiffening web, wherein the first base flange and the first top flange are arranged parallel to one another, the first web section is arranged so as to be angled with respect to each of the first base flange and the first top flange, and the first stiffening web is arranged at right angles with respect to the first top flange;
   shaping a second fiber composite semifinished part such that it has, in succession along a second transverse axis, a second base flange, a second web section, a second top flange and a second stiffening web, wherein the second base flange and the second top flange are arranged parallel to one another, the second web section is arranged so as to be angled with respect to each of the second base flange and the second top flange, and the second stiffening web is arranged at right angles with respect to the second top flange;

arranging and fixing the first fiber composite semifinished part and the second fiber composite semifinished part such that the first stiffening web and the second stiffening web are arranged congruently with respect to one another along a common longitudinal axis;

introducing a matrix material into the first fiber composite semifinished part and into the second fiber composite semifinished part; and curing the matrix material.

11. The method according to claim 10, wherein the first stiffening web and the second stiffening web each have a width which varies along the common longitudinal axis.

12. The method according to claim 10, wherein the first fiber composite semifinished part and the second fiber composite semifinished part are formed mirror-symmetrically with respect to one another about the common longitudinal axis.

13. The method according to claim 10, wherein the first fiber composite semifinished part and the second fiber composite semifinished part are shaped such that the first web section and the second web section each have a width which varies along the common longitudinal axis.

14. The method according to claim 10, wherein the method step of the arranging and fixing additionally comprises the arranging and fixing of a third fiber composite semifinished part in a region of the first stiffening web and of the second stiffening web.

15. The method according to claim 14, wherein the third fiber composite semifinished part has a thickness which varies along the common longitudinal axis.

* * * * *